United States Patent Office 3,120,843
Patented Feb. 11, 1964

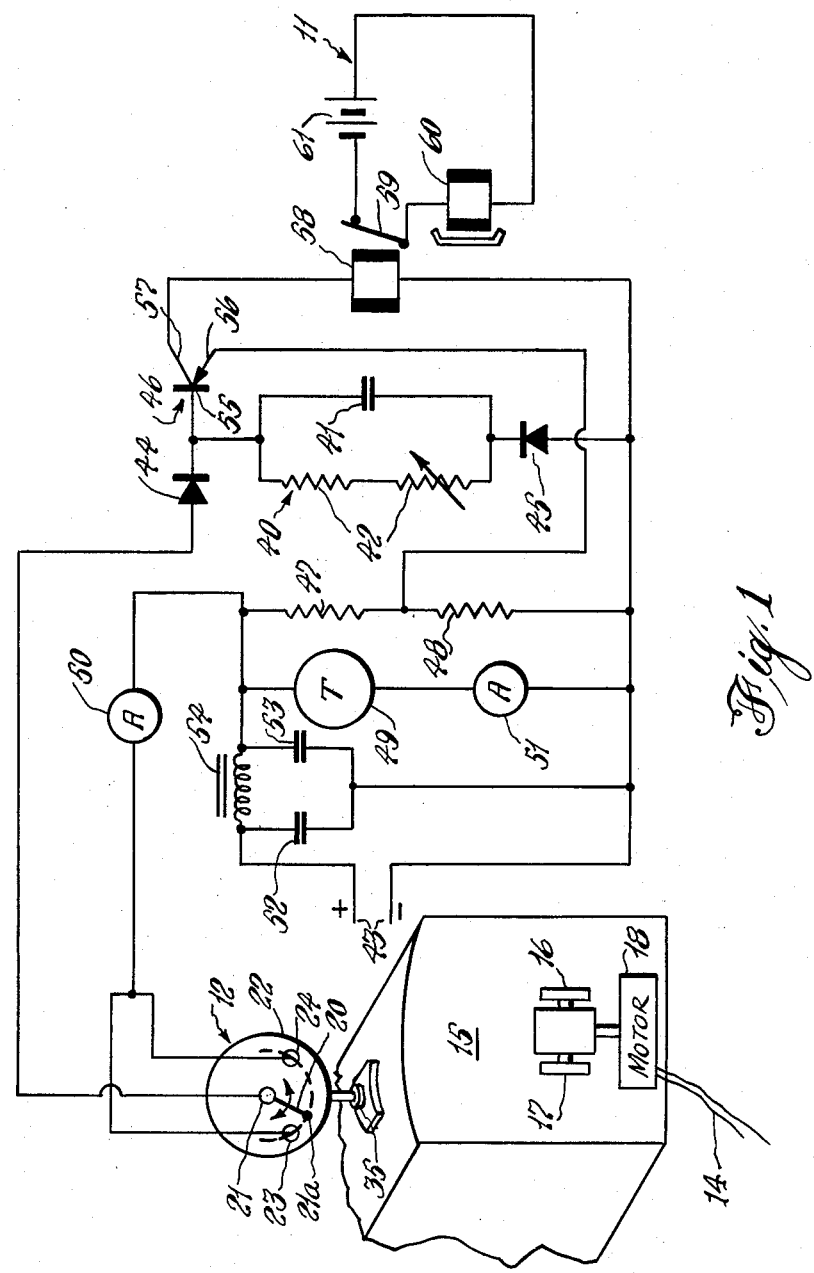

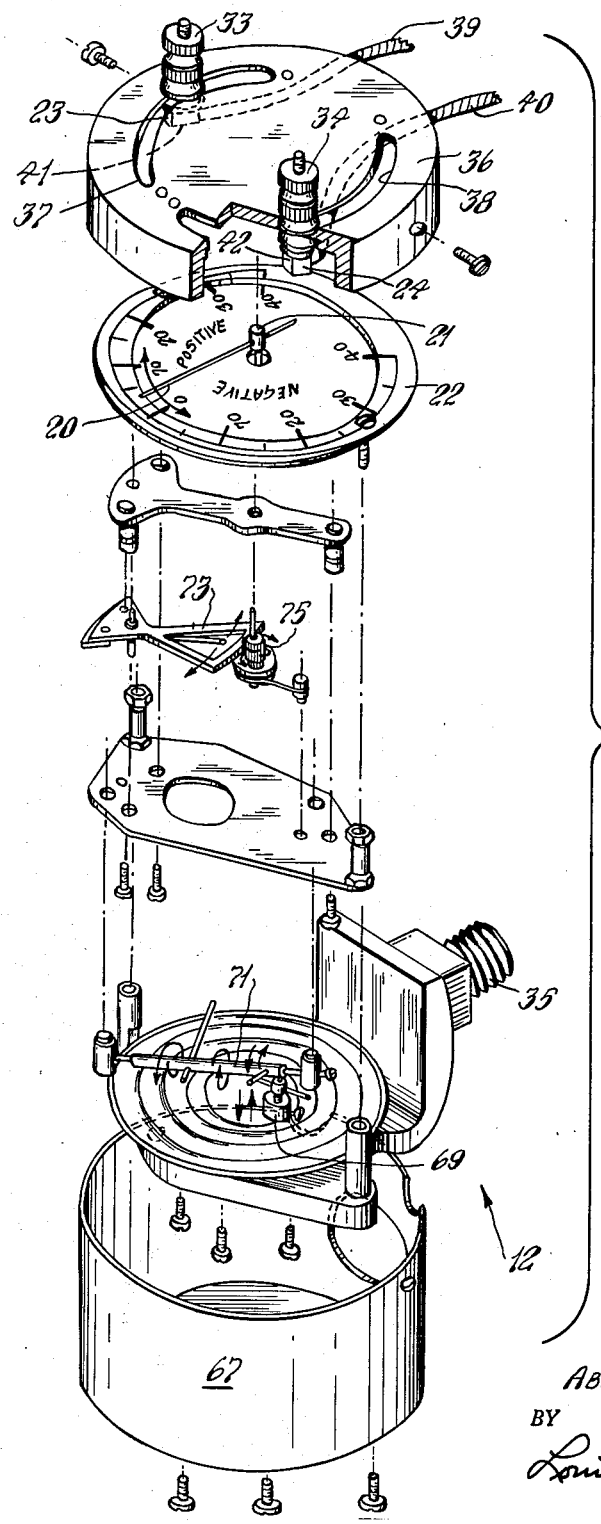

3,120,843
MONITOR FOR MECHANICAL RESPIRATOR
Abraham Hyman, 142 Claudy Lane,
New Hyde Park, N.Y.
Filed July 7, 1959, Ser. No. 825,615
12 Claims. (Cl. 128—30)
(Granted under Title 35, U.S. Code (1952), sec. 266)

The invention described herein may be manufactured and used by or for the Government of the United States of America for governmental purposes without the payment of any royalties thereon or therefor.

The present invention pertains to the art of controlling mechanical operations, and is embodied in a monitor that controls periodic operations at a time interval that is predetermined by the cycle of the mechanical operation.

The invention has been adapted to control operations of a mechanical respirator, and more particularly the type of mechanical respirator which popularly is called an iron lung.

A mechanical respirator operates to subject the chest or lung cavity of a patient to periodic phases of minimum and maximum pressures in a time cycle that simulates natural respiration. In addition to the time cycle of respiration, the minimum or low pressure and the maximum or high pressure are predetermined by prescription for the patient, to constitute the optimum therapeutic respiration for his condition. Minimum and maximum pressures customarily range from below to above atmospheric pressure.

Pressure engines are employed to produce the respective minimum and maximum pressures of mechanical respiration, and are operated in timed relationship to each other according to the prescribed time cycle of respiration. Danger to the patient under therapeutic respiratory treatment occurs when either the minimum pressure or the maximum pressure is not reached and, for obvious reasons, this danger is caused by failure of the corresponding pressure engine to operate, or by its malfunction. There is virtually no practical danger to a patient from a respiratory treatment either below the minimum, or above the maximum, of the prescribed pressure values.

Control apparatus of the invention embodies a response device that operates in response to dangerous misfunction or malfunction of either one or the other of the pressure engines, or both engines. With the invention employed in a mechanical respirator, the response device operates a signal, preferably including an annunciator, to warn of the danger to the patient.

The control apparatus embodies an initiating mechanism, which is operated by the mechanical operation of the respirator, and the conditions under which the initiating mechanism operates depend upon the conditions of mechanical operation of the respirator. When one or the other of the pressure engines fails to operate or operates defectively, the initiating mechanism is operated, thereby to initiate operation of the response device, and the annunciator is operated thereby.

The initiating mechanism constitutes an indicator, which discloses the conditions of its operations at any time during any cycle of its operation. When the annunciator is sounded by operation of the response device, the attendant consults the indicator, and thereby determines the conditions under which the respirator is operating. The attendant thereby is enabled to determine at a glance where the fault lies in the operations of the pressure engines, and is enabled to correct quickly the fault that endangers the patient.

In the disclosed structure of the control apparatus, a time-delay mechanism is set to operate in a time interval that corresponds with the inhalation and exhalation phases of the prescribed cycle for the mechanical respirator, which is set to operate in conformance with the respiratory cycle that is prescribed for the patient. The time-delay mechanism operates the response device at the expiration of its time-delay interval, and the annunciator is operated thereby.

The initiating mechanism operates the time-delay mechanism to initiate operation of its time interval at the ends of the inhalation and exhalation phases of the respiratory cycle. The initiating mechanism is set to initiate the time interval of the time-delay mechanism before expiration of the next previous time-delay interval, and thereby triggers the time-delay mechanism for its operation of the response device.

The initiating mechanism, constituting a trigger mechanism also, triggers operation of the time-delay mechanism in response to the operation of the several pressure engines of the mechanical respirator. During normal operation, when the respirator is performing the therapy of the patient as prescribed, the trigger mechanism initiates the time interval of the time-delay mechanism in each inhalation and exhalation phase of operation before expiration of the time interval that it initiated in the next previous phase, and the time-delay mechanism does not operate the response device. The annunciator is not operated. When, by misfunction or malfunction of one or the other of the pressure engines, the trigger mechanism fails to trigger the time interval of the time-delay mechanism into operation, the next previous time interval continues to run until its expiration, at which time the response device is operated to sound the annunciator.

An attendant alerted thereby can immediately consult the indicator of the initiating mechanism, and thereby be informed of the nature of mechanical malfunction of the respirator. The control apparatus of the invention has monitored the mechanical respirator. The attendant institutes emergency therapy to keep the patient out of danger, and restores the respirator to proper mechanical operation.

The control apparatus of the disclosure is electrical. The response device is a response circuit containing an electrical annunciator, and is operated electrically from the time-delay mechanism. The trigger mechanism triggers the time-delay mechanism electrically.

In a mechanical respirator of the mechanical lung type, the patient is enclosed in a container or tank, the internal atmosphere of which is subjected to pressure variations that simulate natural respiration by means of a vacuum and a pressure pumping engine operating in the appropriate time sequence for respiration simulation. Respiration thereby is produced by pressure fluctuations inside the tank. The trigger mechanism is attached to the tank in the conventional manner of a pressure gage, and actually constitutes a pressure gage. Its indicator, constituting a dial and a companion indicator arm, embodies an elctrical contactor in the indicating arm, which engages a contact, electrically at each end of its stroke, corresponding with the ends of respective inhalation and exhalation phases of the respiratory cycle of atmosphere in the tank or container. An electrical circuit between the trigger mechanism and the time delay mechanism initiates the time interval of the time-delay mechanism at each electrical contact between the contactor of the indicator arm and one or the other of the contacts, which are located along the dial of the pressure gage.

The principal object of this invention, accordingly, is to provide improved control means for mechanical respirators.

Another object is to provide malfunction indicating means for mechanical respirators.

A further object is to provide timer, switching and indicating means for mechanical respirators characterized by low power requirements, high sensitivity, minimal meter switch contact arcing, low cost and facile use.

Other objects and many of the attendant advantages of this invention will be readily appreciated as the same becomes better understood by reference to the following detailed description when considered in connection with the accompanying drawings wherein:

FIG. 1 is a diagrammatic view of a respirator and a control system therefor; and FIG. 2 is an exploded view of a respirator meter switch.

Similar numerals refer to similar parts throughout the several views.

In control apparatus embodying the invention, the controlling operation is performed by response device 11, and is initiated by initiating mechanism 12.

The invention has been embodied in a mechanical respirator 15, which is a tank type popularly called an iron lung. Respirator 15 constitutes a chamber or container, in which a patient is housed to envelop his chest or lung cavity. Pressure of the atmosphere inside chamber 15 is varied periodically in a time cycle that simulates natural respiration, whereby the patient is treated therapeutically by the different atmospheric pressures producing pressure reaction against the wall of the patient's chest. The patient thereby is subjected to mechanical respiration.

Pressure variations inside container 15 range between a minimum and a maximum pressure, respectively below and above atmospheric pressure outside the container, in a time cycle corresponding with respective inhalation and exhalation phases of the respiratory cycle. A particular respiration therapy is prescribed, which is deemed the optimum for the welfare of the patient. Vacuum pump 16 produces the impulse in container 15 of minimum pressure, and pressure pump 17 produces the impulse of maximum pressure, both pumps being driven by electric motor 18 in a time relationship to each other that conforms with the desired respiratory cycle.

Initiating mechanism 12, which is a pressure-actuated switch, is attached to container 15 like a conventional pressure gage. It comprises a pressure gage having an indicator arm 20 oscillating on the axis of its pivot 21 in an arcuate sweep along dial 22 in response to pressure changes in container 15. Contacts 23 and 24 are positioned along dial 22 at respective opposite ends of the path of travel of indicator arm 20, and corresponding with the ends of respective inhalation and exhalation phases of the respiratory cycle. Indicator arm 20 constitutes a beryllium-copper wire providing an electrical contactor which engages Phosphor bronze contacts 23 and 24 at respective opposite ends of its path of travel.

In the disclosed embodiment, response device 11 in FIG. 1 constitutes an electrical circuit containing electrical annunciator 60, and is powered by electrical energy source 61 constituting a battery or the like. Initiating mechanism 12 operates to initiate energization of response circuit 11, through devices that will be described more fully hereinafter, whenever, contactor-indicator 20 fails to engage either one or the other of the contacts 23 or 24 at the corresponding end of its stroke. Annunciator 60 is sounded thereby, and an attendant is summoned to minister to the patient, and to correct whatever mechanical failure or malfunction of the respirator caused contact 20 to not engage either one or the other of contacts 23 or 24 electrically.

The most likely cause of malfunction of respirator 15 is misfunction or malfunction of one or the other of pumps 16 and 17. Contact 23 is located along dial 22 according to the minimum pressure in container 15 that is prescribed for the patient, and contact 24 is located according to the maximum pressure. (There is no practical danger to the patient from pressure within the container 15 reaching a value somewhat lower than the prescribed minimum, or a value somewhat higher than the prescribed maximum. Therefore, the control apparatus of the disclosed embodiment is constructed to summon the attendant whenever the minimum pressure is higher than the prescribed minimum, or when the maximum pressure is lower than the prescribed maximum.)

When the attendant is summoned by annunciator 60 sounding an alarm of danger to the patient, he consults initiating mechanism 12, whereby he is informed which of the pumps, vacuum 16 or pressure 17, is not operating properly, or whatever other malfunction of the respirator caused the annunciator 60 to sound the alarm. He is enabled thereby to correct the cause of mechanical malfunction quickly, and with a minimum of discomfort and danger to the patient.

The control apparatus of the embodiment of FIG. 1 operates electrically, and is a preferred embodiment because of its sensitivity, its relatively low power consumption, and its elimination of possible contact arcing between contact arm 20 and the contacts 23 and 24.

In FIG. 1, any suitable energy source for motor 18 is supplied through line 14. The time-delay device is embodied in RC circuit 40, of which capacitor 41 is discharged by variable resistor 42 at a predetermined time rate. Resistor 42 is variable, as shown, to adjust the time interval of capacitor 41 to operate in conformance with the time interval of the respiratory cycle of respirator 15.

Time-delay circuit 40 is connected with D.C. line 43, as seen, through point 21a of contactor 20, and alternately through contacts 23 and 24 of trigger mechanism 12. In opposite leads away from time-delay circuit 40, respective semi-conductor diodes 44 and 45 enable current flow to the time-delay circuit whenever point 21a of contactor 20 engages one or the other contact 23 or 24, but permits only a very low inverse current flow because of the high front-to-back impedance ratios of the several diodes 44 and 45. By their location in the circuit of the monitor device, a very high impedance is produced towards trigger mechanism 12 and to transistor 46 looking from the junction points of the $R \times C$ elements 42 and 41. A high $R \times C$ time constant is maintained by time-delay circuit 40 being isolated from the low impedance components, hereafter described in the voltage control part of the monitor circuit. Transistor 46 is also, inherently, a low impedance device.

The voltage divider of the monitor circuit consists of resistors 47 and 48, which divides the voltage of D.C. line 43 for the necessary emitter level. By reason of its inverse characteristic, thermistor 49 regulates the input voltage level from line 43 over a range of from 18 to 32 volts. The power filter consists of capacitors 52 and 53, and choke 54 is employed when the D.C. power is supplied through a rectifier, not shown, to eliminate 60 and 120 cycle ripple. Transistor 46, of the type CK–725, is biased so that, with a positive charge on its base 55, there is no conduction between emitter 56 and collector 57, which maintains relay 58 of response circuit 11 de-energized.

When point 21a of contactor 20 engages one or the other of contacts 23 or 24, current flow to time-delay circuit 40 charges capacitor 41, the discharge-time interval of which is established by the setting of the variable resistor 42. The time interval of time-delay circuit 40 being set in accordance with the time interval of the respiratory cycle that is prescribed for the patient, during normal operation of respirator 15, point 21a of contactor 20 engages the other of contacts 23 and 24 before the time interval of time-delay circuit 40 expires, because the distance between contacts 23 and 24 is set for the time interval between the highest permissible minimum pressure and lowest permissible maximum pressure of respirator 15 during its normal operation.

Therefore, capacitor 41 does not discharge unless contactor 20 fails to travel in one or the other direction far enough for its point 21a to engage the corresponding contact 23 or 24. When point 21a fails to engage one or the other of contacts 23 or 24, variable resistor 42 continues to discharge capacitor 41 to completion of the time interval for which time-delay circuit 40 is set, which occurs during reverse travel of contactor 20. Base 55 of transistor 46 is then unbiased, causing current flow between emitter 56 and collector 57, which energizes relay 58.

Contacts 59 of relay 58 are held in open position electrically whenever the relay is de-energized, and is actuated to closed position by the relay being energized. Response circuit 11 is closed thereby, when relay 58 is energized by current flow through transistor 46, energizing annunciator 60 from its independent power source 61. The attendant is summoned by annunciator 60.

A preferred embodiment of the meter switch is shown in FIG. 2. Such meter switch or trigger mechanism 12 is attached to respirator 15 by means of nipple 35. Above its dial 22, the transparent lens 36 comprises the arcuate guideways 37 and 38, on which respective contacts 23 and 24 are attached to be positioned adjacent the dial scale 22 along respective lower and upper pressure values thereof. Respective adjustment means 33 and 34 enable contacts 23 and 24 to be located along scale 22 in any desired position according to the prescribed respiratory therapy. Flexible and elastic electrical conductors 80 and 83 are secured to each of respective contacts 23 and 24 to constitute leads in the circuit of FIG. 1.

Indicator arm 20 comprises a length of resilient and flexible rod stock of any suitable electrical conducting material, and is secured to project radially away from its pivot 21 of the pressure gage 12. In its oscillatory path of travel, indicator arm 20, constituting an electrical contactor also, engages each contact 23 and 24 along its contacting edge, 81 and 82 respectively, near respective opposite ends of its path of travel.

The time interval of time-delay relay is adjusted to conform with the time interval of the inhalation and exhalation phases of the respiratory cycle that is prescribed for the therapy of the patient. With pumps 16 and 17 of the mechanical respirator adjusted to perform the prescribed respiratory therapy, contacts 23 and 24 are adjustably positioned along their respective arcuate guideways 37 and 38 by means of their respective adjustment means 33 and 34 for contactor arm 20 to engage the contacts along their respective contact edges at a predetermined time interval before respective opposite ends of the path of travel of the contactor arm. This adjustment is made when the mechanical respirator is operating, and is known to be operating to perform the desired respiratory therapy.

Each time that contactor 20 engages one or the other contacts 23 or 24, it begins operation of the time-interval of time-delay relay 28. This occurs before the end of the incident stroke of contactor 20, and before the next previous time interval of time-delay circuit 40 has expired. Time-delay circuit 40 is triggered by the contactor arm 20 engaging the contact 23 or 24, which prevents expiration of the next previous time interval. Engagement between contact arm 20 and one or the other contact 23 or 24 begins before the end of the stroke of the contact arm, and continues to the end of the stroke and into the next stroke in the opposite direction until the contact arm moves out of engagement with the contact, at which time the next time interval of time-delay circuit 40 begins to run. The gage of rod stock of indicator arm 20 is fine enough to flex during electrical engagement with one or the other of contacts 23 or 24, with negligible resistance to flexure.

During normal operation of respirator 15 in accordance with the prescribed respiratory cycle, time-delay circuit capacitor 41 is charged each time contactor arm 20 engages one or the other contact 23 or 24. When contactor arm 20 next engages the other of respective contacts 24 or 23, the time interval of time-delay capacitor 41 is triggered again before the next previous time interval has expired, and the relay contacts 59 do not close the response circuit 11. Therefore, annunciator 60 is not sounded so long as respirator 15 operates satisfactorily in accordance with the prescribed respiratory cycle. The meter switch 12 comprises a housing 67 in which pressure-responsive means 69 translates in a first sense in response to positive pressure and in the opposite sense in response to negative pressure. The means 69 is coupled to indicator arm 20 through the linkages 71, 73 and 75 in the usual manner.

When one or the other pumps, vacuum 16 and pressure 17 respectively, fails to operate or operates defectively so that a minimum pressure value in container 15 is reached which is higher than is prescribed, or a maximum pressure value is reached which is less than is prescribed, contact arm 20 fails to engage the corresponding contact, 23 or 24 respectively. Time-delay circuit 40 is not triggered, and its next previous time interval runs to its expiration, whereby relay contacts 59 are closed, and response circuit 11 operates to sound annunciator 60. By consulting the pressure gage of initiating mechanism 12, the attendant is informed as to which of the pumps 16 or 17 requires readjustment, repair or replacement.

Obviously many modifications and variations of the present invention are possible in the light of the above teachings. It is therefore to be understood that within the scope of the appended claims the invention may be practiced otherwise than as specifically described.

I claim:

1. An alarm device for a mechanical respirator having a pressure chamber for containing a patient in its atmosphere and pressure control apparatus to raise and reduce the pressure in the chamber between predetermined maximum and minimum magnitudes in a predetermined time interval, said alarm device comprising, in combination: pressure-actuated switch means arranged to make periodic electrical contact upon the occurrence of at least two different pressure magnitudes in said pressure chamber; time-delay means connected to said pressure-actuated switch means for energization whenever electrical contact is made thereby, the interval between successive contacts of said pressure-actuated switch means being somewhat smaller than the period of said time-delay means, said time-delay means including a resistance-capacitance network and at least one diode isolation device having high impedance to current in one direction and low impedance to current in the other direction, said network and diode being connected in a circuit suitable for charging the capacitance in said network, the capacitance being charged through said diode device and seeing a high impedance looking backward through said diode device; and warning means connected to said time-delay means for energization whenever one delay interval of said time-delay means fully elapses without said time-delay means being energized to initiate another delay interval, said warning means including a switching device which is operable at a predetermined potential level by an operating potential comprising a potential derived from said resistance-capacitance network.

2. An alarm device for a mechanical respirator having a pressure chamber for containing a patient in its atmosphere and pressure control apparatus to raise and reduce the pressure in the chamber between predetermined maximum and minimum magnitudes in a predetermined time interval, said alarm device comprising, in combination: pressure-actuated switch means arranged to make periodic electrical contact upon the occurrence of at least two different pressure magnitudes in said pressure chamber; time-delay means connected to said pressure-actuated switch means for energization whenever electrical contact is made thereby, the interval between successive contacts of said pressure-actuated switch means being somewhat smaller than the period of said time-delay means, said time-delay means including a resistance-capacitance network and two diode isolation devices having high impedance to current flow in one direction and low impedance to current flow in the other direction, said diodes and network being connected in series so that said network is between said diodes and is presented with a high impedance by each of said diodes, the capacitance in said network being chargeable through said diodes; and warning means connected to said time-delay means for energization whenever one delay interval of said time-delay means fully elapses without said time-delay means being energized to initiate another delay interval, said warning means including a switching device which is operable at a predetermined potential level by an operating potential comprising a potential derived from said resistance-capacitance network.

3. An alarm device for a mechanical respirator having a pressure chamber for containing a patient in its atmosphere and pressure control apparatus to raise and reduce the pressure in the chamber between predetermined maximum and minimum magnitudes in a predetermined time interval, said alarm device comprising, in combination: pressure-actuated switch means arranged to make periodic electrical contact upon the occurrence of at least two different pressure magnitudes in said pressure chamber; time-delay means connected to said pressure-actuated switch means for energization whenever electrical contact is made thereby, the interval between successive contacts of said pressure-actuated switch means being somewhat smaller than the period of said time-delay means, said time-delay means including a resistance-capacitance network and at least one semiconductor diode isolation device, said network and diode device being connected in a circuit suitable for charging the capacitance in said network, the capacitance being charged through said diode device and seeing a high impedance looking backward through said diode device; and warning means connected to said time-delay means for energization whenever one delay interval of said time-delay means fully elapses without said time-delay means being energized to initiate another delay interval, said warning means including a switching device which is operable at a predetermined potential level by an operating potential comprising a potential derived from said resistance-capacitance network.

4. An alarm device for a mechanical respirator having a pressure chamber for containing a patient in its atmosphere and pressure control apparatus to raise and reduce the pressure in the chamber between predetermined maximum and minimum magnitudes in a predetermined time interval, said alarm device comprising, in combination: pressure-actuated switch means arranged to make periodic electrical contact upon the occurrence of at least two different pressure magnitudes in said pressure chamber; time-delay means connected to said pressure-actuated switch means for energization whenever electrical contact is made thereby, the interval between successive contacts of said pressure-actuated switch means being somewhat smaller than the period of said time-delay means, said time-delay means including a resistance-capacitance network and two semiconductor diode isolation devices, said diode devices and said network being connected in series so that said network is between said diode devices and is presented with a high impedance by each of said diode devices, the capacitance in said network being chargeable through said diode devices; and warning means connected to said time-delay means for energization whenever one delay interval of said time-delay means fully elapses without said time-delay means being energized to initiate another delay interval, said warning means including a switching device which is operable at a predetermined potential level by an operating potential comprising a potential derived from said resistance-capacitance network.

5. An alarm device for a mechanical respirator having a pressure chamber for containing a patient in its atmosphere and pressure control apparatus to raise and reduce the pressure in the chamber between predetermined maximum and minimum magnitudes in a predetermined time interval, said alarm device comprising, in combination: pressure-actuated switch means arranged to make periodic electrical contact upon the occurrence of at least two different pressure magnitudes in said pressure chamber; time-delay means connected to said pressure actuated switch means for energization whenever electrical contact is made thereby, the interval between successive contacts of said pressure-actuated switch means being somewhat smaller than the period of said time-delay means, said time-delay means including a resistance-capacitance network and at least one semiconductor diode isolation device, said network and diode device being connected in a circuit suitable for charging the capacitance in said network, the capacitance being charged through said diode device and seeing a high impedance looking backward through said diode device and warning means connected to said time-delay means for energization whenever one delay interval of said time-delay means fully elapses without said time-delay means being energized to initiate another delay interval, said warning means including a transistor switching device which is operable at a predetermined potential level by an operating potential comprising a potential derived from said resistance-capacitance network.

6. An alarm device for a mechanical respirator having a pressure chamber for containing a patient in its atmosphere and pressure control apparatus to raise and reduce the pressure in the chamber between predetermined maximum and minimum magnitudes in a predetermined time interval, said alarm device comprising, in combination: pressure-actuated switch means arranged to make periodic electrical contact upon the occurrence of at least two different pressure magnitudes in said pressure chamber; time-delay means connected to said pressure-actuated switch means for energization whenever electrical contact is made thereby, the interval between successive contacts of said pressure-actuated switch means being somewhat smaller than the period of said time-delay means, said time-delay means including a resistance-capacitance network and two semiconductor diode isolation devices, said diode devices and said network being connected in series so that said network is between said diode devices and is presented with a high impedance by each of said diode devices, the capacitance in said network being chargeable through said diode devices; and warning means connected to said time-delay means for energization whenever one delay interval of said time-delay means fully elapses without said time-delay means being energized to initiate another delay interval, said warning means including a transistor switching device which is operable at a predetermined potential level by an operating potential comprising a potential derived from said resistance-capacitance network.

7. An alarm device for a mechanical respirator having a pressure chamber for containing a patient in its atmosphere and pressure control apparatus to raise and reduce the pressure in the chamber between predetermined maximum and minimum magnitudes in a predetermined time interval, said alarm device comprising, in combination: pressure-actuated switch means arranged to make periodic electrical contact upon the occurrence of at least two different pressure magnitudes in said pressure chamber, said pressure-actuated switch means comprising a gage having a pivotable gage needle movable in accordance with the pressure magnitude in said pressure chamber, a pair of spaced electrical contacts situated along the arc of travel of said needle so that said needle comes into electrical contact with them when it reaches their positions and a pair of stops spaced outwardly of said contacts, said needle being formed from a resilient metal so that it flexes if the pressure is either higher or lower than that which is just sufficient to bring said needle into contact with the proper one of said stops; time-delay means connected to said pressure-actuated switch means for energization whenever electrical contact is made thereby, the interval between successive contacts of said pressure-actuated switch means being somewhat smaller than the period of said time-delay means, said time-delay means including a resistance-capacitance network and at least one diode device having high impedance to current in one direction and low impedance to current in the other direction, said network and diode being connected in a circuit suitable for charging the capacitance in said network; and warning means connected to said time-delay means for energization whenever one delay interval of said time-delay means fully elapses without said time-delay means being energized to initiate another delay interval, said warning means including a switching device which is operable at a predetermined potential level by an operating potential comprising a potential derived from said resistance-capacitance network.

8. An alarm device for a mechanical respirator having a pressure chamber for containing a patient in its atmosphere and pressure control apparatus to raise and reduce the pressure in the chamber between predetermined maximum and minimum magnitudes in a predetermined time interval, said alarm device comprising, in combination: pressure-actuated switch means arranged to make periodic electrical contact upon the occurrence of at least two different pressure magnitudes in said pressure chamber, said pressure-actuated switch means comprising a gage having a pivotable gage needle movable in accordance with the pressure magnitude in said pressure chamber, a pair of spaced electrical contacts situated along the arc of travel of said needle so that said needle comes into electrical contact with them when it reaches their positions and a pair of stops spaced outwardly of said contacts, said needle being formed from a resilient metal so that it flexes if the pressure is either higher or lower than that which is just sufficient to bring said needle into contact with the proper one of said stops; time-delay means connected to said pressure-actuated switch means for energization whenever electrical contact is made thereby, the interval between successive contacts of said pressure-actuated switch means being somewhat smaller than the period of said time-delay means, said time-delay means including a resistance-capacitance network and two diode devices having high impedance to current flow in one direction and low impedance to current flow in the other direction, said diodes and network being connected in series so that said network is between said diodes and is presented with a high impedance by each of said diodes, the capacitance in said network being chargeable through said diodes; and warning means connected to said time-delay means for energization whenever one delay interval of said time-delay means fully elapses without said time-delay means being energized to initiate another delay interval, said warning means including a switching device which is operable at a predetermined potential level by an operating potential comprising a potential derived from said resistance-capacitance network.

9. An alarm device for a mechanical respirator having a pressure chamber for containing a patient in its atmosphere and pressure control apparatus to raise and reduce the pressure in the chamber between predetermined maximum and minimum magnitudes in a predetermined time interval, said alarm device comprising, in combination: pressure-actuated switch means arranged to make periodic electrical contact upon the occurrence of at least two different pressure magnitudes in said pressure chamber, said pressure-actuated switch means comprising a gage having a pivotable gage needle movable in accordance with the pressure magnitude in said pressure chamber, a pair of spaced electrical contacts situated along the arc of travel of said needle so that said needle comes into electrical contact with them when it reaches their positions and a pair of stops spaced outwardly of said contacts, said needle being formed from a resilient metal so that it flexes if the pressure is either higher or lower than that which is just sufficient to bring said needle into contact with the proper one of said stops; time-delay means connected to said pressure-actuated switch means for energization whenever electrical contact is made thereby, the interval between successive contacts of said pressure-actuated switch means being somewhat smaller than the period of said time-delay means, said time-delay means including a resistance-capacitance network and at least one semiconductor diode device, said network and diode device being connected in a circuit suitable for charging the capacitance in said network; and warning means connected to said time-delay means for energization whenever one delay interval of said time-delay means fully elapses without said time-delay means being energized to initiate another delay interval, said warning means including a switching device which is operable at a predetermined potential level by an operating potential comprising a potential derived from said resistance-capacitance network.

10. An alarm device for a mechanical respirator having a pressure chamber for containing a patient in its atmosphere and pressure control apparatus to raise and reduce the pressure in the chamber between predetermined maximum and minimum magnitudes in a predetermined time interval, said alarm device comprising, in combination: pressure-actuated switch means arranged to make periodic electrical contact upon the occurrence of at least two different pressure magnitudes in said pressure chamber, said pressure-actuated switch means comprising a gage having a pivotable gage needle movable in accordance with the pressure magnitude in said pressure chamber, a pair of spaced electrical contacts situated along the arc of travel of said needle so that said needle comes into electrical contact with them when it reaches their positions and a pair of stops spaced outwardly of said contacts, said needle being formed from a resilient metal so that it flexes if the pressure is either higher or lower than that which is just sufficient to bring said needle into contact with the proper one of said stops; time-delay means connected to said pressure-actuated switch means for energization whenever electrical contact is made thereby, the interval between successive contacts of said pressure-actuated switch means being somewhat smaller than the period of said time-delay means, said time-delay means including a resistance-capacitance network and two semiconductor diode devices, said diode devices and said network being connected in series so that said network is between said diode devices and is presented with a high impedance by each of said diode devices, the capacitance in said network being chargeable through said diode devices; and warning means connected to said time-delay means for energization whenever one delay interval of said time-delay means fully elapses without said time-delay means being energized to initiate another delay interval, said warning means including a switching device which is operable at a predetermined potential level by an operating potential comprising a potential derived from said resistance-capacitance network.

11. An alarm device for a mechanical respirator having a pressure chamber for containing a patient in its atmosphere and pressure control apparatus to raise and reduce the pressure in the chamber between predetermined maximum and minimum magnitudes in a predetermined time interval, said alarm device comprising, in combination: pressure-actuated switch means arranged to make periodic electrical contact upon the occurrence of at least two different pressure magnitudes in said pressure chamber, said pressure-actuated switch means comprising a gage having a pivotable gage needle movable in accordance with the pressure magnitude in said pressure chamber, a pair of spaced electrical contacts situated along the arc of travel of said needle so that said needle comes into electrical contact with them when it reaches their positions and a pair of stops spaced outwardly of said contacts, said needle being formed from a resilient metal so that it flexes if the pressure is either higher or lower than that which is just sufficient to bring said needle into contact with the proper one of said stops; time-delay means connected to said pressure actuated-switch means for energization whenever electrical contact is made thereby, the interval between successive contacts of said pressure-actuated switch means being somewhat smaller than the period of said time-delay means, said time-delay means including a resistance-capacitance network and at least one semiconductor diode device, said network and diode device being connected in a circuit suitable for charging the capacitance in said network; and warning means connected to said time-delay means for energization whenever one delay interval of said time-delay means fully elapses without said time-delay means being energized to initiate another delay interval, said warning means including a transistor switching device which is operable at a predetermined potential level by an operating potential comprising a potential derived from said resistance-capacitance network.

12. An alarm device for a mechanical respirator having a pressure chamber for containing a patient in its atmosphere and pressure control apparatus to raise and reduce the pressure in the chamber between predetermined maximum and minimum magnitudes in a predetermined time interval, said alarm device comprising, in combination: pressure-actuated switch means arranged to make periodic electrical contact upon the occurrence of at least two different pressure magnitudes in said pressure chamber, said pressure-actuated switch means comprising a gage having a pivotable gage needle movable in accordance with the pressure magnitude in said pressure chamber, a pair of spaced electrical contacts situated along the arc of travel of said needle so that said needle comes into electrical contact with them when it reaches their positions and a pair of stops spaced outwardly of said contacts, said needle being formed from a resilient metal so that it flexes if the pressure is either higher or lower than that which is just sufficient to bring said needle into contact with the proper one of said stops; time-delay means connected to said pressure-actuated switch means for energization whenever electrical contact is made thereby, the interval between successive contacts of said pressure-actuated switch means being somewhat smaller than the period of said time-delay means, said time-delay means including a resistance-capacitance network and two semiconductor diode devices, said diode devices and said network being connected in series so that said network is between said diode devices and is presented with a high impedance by each of said diode devices, the capacitance in said network being chargeable through said diode devices; and warning means connected to said time-delay means for energization whenever one delay interval of said time-delay means fully elapses without said time-delay means being energized to initiate another delay interval, said warning means including a transistor switching device which is operable at a predetermined potential level by an operating potential comprising a potential derived from said resistance-capacitance network.

References Cited in the file of this patent

UNITED STATES PATENTS

| | | |
|---|---|---|
| 2,461,075 | Naylor | Feb. 8, 1949 |
| 2,588,192 | Akerman | Mar. 4, 1952 |
| 2,780,222 | Polzin | Feb. 5, 1957 |
| 2,834,953 | Bechberger | May 13, 1958 |
| 2,867,754 | O'Bleness | June 6, 1959 |

FOREIGN PATENTS

| | | |
|---|---|---|
| 745,307 | Great Britain | Feb. 22, 1956 |